(12) United States Patent
Mohanty et al.

(10) Patent No.: US 8,488,001 B2
(45) Date of Patent: Jul. 16, 2013

(54) SEMI-AUTOMATIC RELATIVE CALIBRATION METHOD FOR MASTER SLAVE CAMERA CONTROL

(75) Inventors: Kamini Kanta Mohanty, Orissa (IN); Mahesh Kumar Gellaboina, Andhra Pradesh (IN); Jeremy Craig Wilson, Delta (CA)

(73) Assignee: Honeywell International Inc., Morristown, NJ (US)

( * ) Notice: Subject to any disclaimer, the term of this patent is extended or adjusted under 35 U.S.C. 154(b) by 895 days.

(21) Appl. No.: 12/331,741

(22) Filed: Dec. 10, 2008

(65) Prior Publication Data

US 2010/0141767 A1   Jun. 10, 2010

(51) Int. Cl.
*H04N 7/18* (2006.01)
(52) U.S. Cl.
USPC ............................................. 348/159; 348/143
(58) Field of Classification Search
USPC .................................................. 348/159, 143
See application file for complete search history.

(56) References Cited

U.S. PATENT DOCUMENTS

| | | | | |
|---|---|---|---|---|
| 5,164,827 A | * | 11/1992 | Paff | 348/143 |
| 5,528,289 A | * | 6/1996 | Cortjens et al. | 348/211.9 |
| 5,875,305 A | * | 2/1999 | Winter et al. | 709/231 |
| 6,215,519 B1 | * | 4/2001 | Nayar et al. | 348/159 |
| 7,151,562 B1 | | 12/2006 | Trajkovic | |
| 7,629,995 B2 | * | 12/2009 | Salivar et al. | 348/143 |
| 7,990,422 B2 | * | 8/2011 | Ahiska et al. | 348/218.1 |
| 8,085,302 B2 | * | 12/2011 | Zhang et al. | 348/169 |
| 2004/0105004 A1 | * | 6/2004 | Rui et al. | 348/159 |
| 2005/0090961 A1 | * | 4/2005 | Bonk et al. | 701/50 |
| 2005/0134685 A1 | * | 6/2005 | Egnal et al. | 348/157 |
| 2006/0028548 A1 | | 2/2006 | Salivar et al. | |
| 2006/0056056 A1 | * | 3/2006 | Ahiska et al. | 359/690 |
| 2006/0120588 A1 | * | 6/2006 | Kwon et al. | 382/141 |
| 2006/0203090 A1 | * | 9/2006 | Wang et al. | 348/143 |
| 2006/0203098 A1 | | 9/2006 | Henninger, III et al. | |
| 2007/0200933 A1 | * | 8/2007 | Watanabe et al. | 348/211.11 |
| 2008/0104027 A1 | * | 5/2008 | Imler et al. | 707/3 |
| 2008/0198178 A1 | * | 8/2008 | Julin et al. | 345/661 |
| 2009/0079830 A1 | * | 3/2009 | Ekpar | 348/148 |
| 2009/0096909 A1 | * | 4/2009 | Yamashita | 348/333.01 |
| 2009/0154808 A1 | * | 6/2009 | Gao et al. | 382/173 |
| 2009/0315996 A1 | * | 12/2009 | Guler et al. | 348/169 |
| 2010/0002082 A1 | * | 1/2010 | Buehler et al. | 348/159 |
| 2012/0038776 A1 | * | 2/2012 | Ahiska et al. | 348/159 |

\* cited by examiner

*Primary Examiner* — Anthony Mejia
(74) *Attorney, Agent, or Firm* — Husch Blackwell (57) ABSTRACT

A method for capturing surveillance images includes of a secured area has a first camera with a first field of view and a second camera with a second field of view. An optical center is determined for the second field of view. A magnification ratio is determined between a target located in the first field of view relative to the second field of view. A pan and tilt model is determined that provides a relationship between a first camera coordinates and pan and tilt values to position the second camera at the optical center. A target is captured in the first field of view and the second camera is controlled to record the target in the second field of view with the second field of view being an enhanced view relative to the first field of view.

17 Claims, 8 Drawing Sheets

SEMI-AUTOMATIC RELATIVE CALIBRATION METHOD FOR MASTER SLAVE CAMERA CONTROL

FIELD OF THE INVENTION

This invention generally relates to security systems. More particularly, the present disclosure relates to a surveillance system with a first wide field of view camera acting together with a second pan, tilt, zoom camera in a master-slave control relationship. The first wide field of view camera can monitor an area for a target of interest. The second pan, tilt, zoom camera, once properly calibrated, can automatically obtain an enhanced view of the target with the help of the first camera.

BACKGROUND OF THE INVENTION

Security systems are known in the art. Often a security guard will monitor an area for a target of interest, such as, for example a person, or automobile in a secure area. Generally, to capture a large area, one would record the secure area using a camera having a large field of view. Additionally, these large field of view cameras are economically viable for such applications due to their cost. However, these wide field of view cameras are often poor in their ability to provide adequate resolution for clearly identifying targets located within the field of view of the camera.

Generally, pan, tilt, zoom cameras are more expensive than the previously mentioned cameras. Pan, tilt zoom cameras are very effective for obtaining close up images of the targets. With these magnified images, security personnel can view these images in great detail and provide a monitoring security function. Unfortunately, if used alone, a single pan, tilt, zoom camera cannot effectively monitor a large and wide field of view of the secured area. If one adds many pan, tilt zoom cameras to view an area, additionally, some targets can be missed if there are not enough pan, tilt, and zoom cameras (hereafter "PTZ cameras") for an area. This large number of PTZ cameras can also dramatically increase the costs associated with the system. Generally, large field of view cameras, and pan, tilt, zoom cameras are generally difficult to coordinate and control together.

Secondly, images taken by one camera system are generally not immediately compatible with the images taken from a second camera system. Often to zoom on a target object found with a first field of view camera, a second pan, tilt, zoom camera may zoom in on the wrong location, or zoom the image too much so the target is larger than the field of view.

The present invention relates in general to video systems for a security and monitoring application. One embodiment is directed to a camera and a display system. The system provides both a wide angle field of view and a narrower field of view of an environment for monitoring a target. The target can be monitored in the wide angle field of view. Then, the user can obtain an enhanced view of the target using a second camera in an automatic or semi-automatic manner where the two cameras are calibrated in an effective manner. The system has the ability to view a large area within an environment, and also has the ability to focus in on objects or events of interest within the environment. Such capabilities may be useful for a variety of purposes including, but not limited to, surveillance applications.

United States Published Patent Application No. 2006/0028548 A1 to Salivar et al. discloses an immersive camera system and a pan, tilt, zoom camera system with each camera system being coupled to a processor. The two systems can be correlated with one another using a data unit to correct for parallax effects. Data point object positions can be manually noted by orienting the pan, tilt, zoom camera to view the data point object in a center of the pan, tilt, zoom image. The system notes a fixed point in the immersive image where the user clicked while also noting an orientation of the PTZ camera at the time the user clicked.

However, these procedures are time intensive and do not result in reliable calibration of the two systems, with all sets of images, and particularly are deficient when the target is fast moving through the field of view. A two camera system having a more effective calibration is needed.

SUMMARY OF THE INVENTION

According to a first aspect of the present disclosure, there is provided a method that provides a first camera with a first field of view and a second camera with a second field of view. An optical center is determined for the second field of view. A magnification ratio is determined between a target located in the first field of view relative to the second field of view. A pan and tilt model is determined that provides a relationship between the target coordinates from a first camera and the pan and tilt values required to position the target at the optical center of a second camera. A target is captured in the first field of view and the second camera is controlled to record the target in the second field of view with the second field of view being an enhanced (zoomed, panned, masked, or tilted) view relative to the first field of view.

According to another aspect of the present disclosure, there is provided a security system that includes a first camera recording a first field of view and a second camera including a panning function, a tilting function, and a zooming (or magnifying) function recording a second field of view. The first camera records a target in the first field of view, and outputs a control signal to a computing device. The signal is indicative of a location parameter of the target in the fixed field of view.

The computing device receives the control signal and converts the control signal to a second signal. The second camera receiving the second signal engages in at least one function. The function may include the panning function, the tilting function, and/or the zooming function. This function is to record the target in the second field of view in response to the second signal. The second camera is calibrated to the first camera by a model that includes parameters. The parameters include at least one of (a) an optical center for the second field of view, (b) a magnification ratio between the target located in the first field of view relative to the second field of view and (c) a pan and tilt model that provides a relationship between a first camera coordinates and pan and tilt values to position the target at optical center of the second camera.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF THE INVENTION

Figure 1:
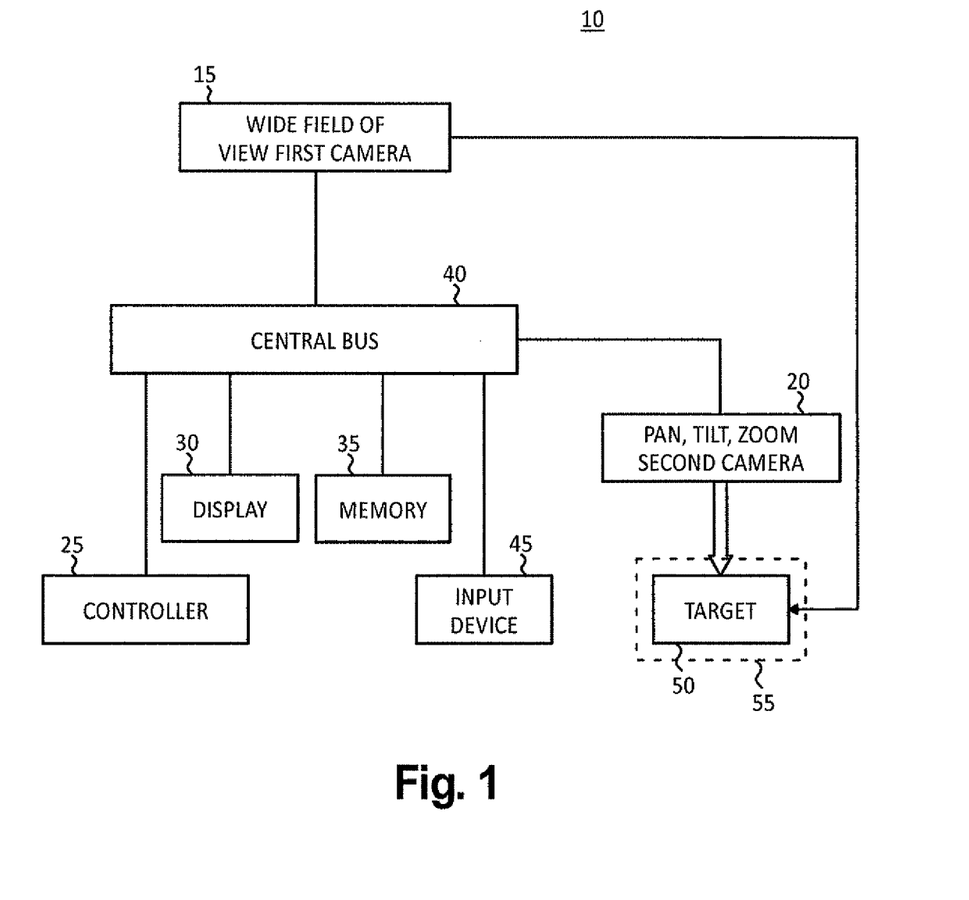
FIG. 1 is a simplified view of a security system that includes a first wide field of view camera and a second PTZ camera operatively connected to a computing device.

The present disclosure is directed to a security system 10 that includes a first camera 15 and a second camera 20 that cooperate with one another in a master-slave control relationship. In the exemplary embodiment, each of the first camera 15 and the second camera 20 are operatively connected to a controller 25 by suitable connectors and provide video signals, which are converted to a digital format and supplied to the controller 25. The controller 25 outputs the video signals to a display system 30 where a security guard or similar individual can monitor the images on the display system 30 representative of the images being recorded or captured from the first and the second cameras 15 and 20. In the exemplary embodiment, the controller 25 is operatively connected to a memory 35 by a central bus 40.

In the exemplary embodiment, the security system 10 provides for a master-slave control relationship between the first camera 15 and the second camera 20 so at least one camera 15, 20 can be controlled by the other camera 15, 20 to obtain enhanced images. For example, the first camera 15 can be a camera suitable for a wide field of view of a secured area while the second camera 20 can be a camera suitable for a pan, tilt, and zoom functionality. In operation, a target 50 can enter the secured area 55 and be spotted by the first camera 15 in the first wide field of view. Then, the second camera 20 can capture more detailed magnified images or follow the target 50 through the first field of view 55. Second camera 20 automatically provides this enhanced information to the security guard. This enhanced image provides additional details pertaining to the target 50. These may include an individual's appearance, a license plate number or whether the individual is loitering. After providing the magnified enhanced view by the second camera 20, then the first camera 15 can then return to normal monitoring operation. Later, the second camera 20 can provide an enhanced magnified view of a second target once the second target enters the wide field of view 55 of the first camera 15.

The first camera 15 and the second camera 20 are calibrated with one another using an input device 45, such as, a graphical user interface, touch screen, mouse, etc. and the controller 25 provides an effective security monitoring system 10. A target 50 is detected using an input device 45 and a display 30. The display 30 will output the image from the first camera 15 and a user using an input device 45 will draw a bounding box in the image around the target 50 or by providing some other input command. In an alternative embodiment, the input device 45 can also use video motion detection, object tracking, and/or an object classification algorithm to automatically generate a bounding box in the first camera image around the target 50. The controller 25 receives the input from input device 45 and provides a command signal to the second camera 20 including a set of pan, tilt, and zoom values to control the second camera 20 to generate the magnified image at the desired location. In the exemplary embodiment, the first and the second camera 15, 20 are calibrated with one another and the calibration results in an optical center model, a zoom model, and a pan tilt model to provide the master-slave control relationship.

Figure 2:
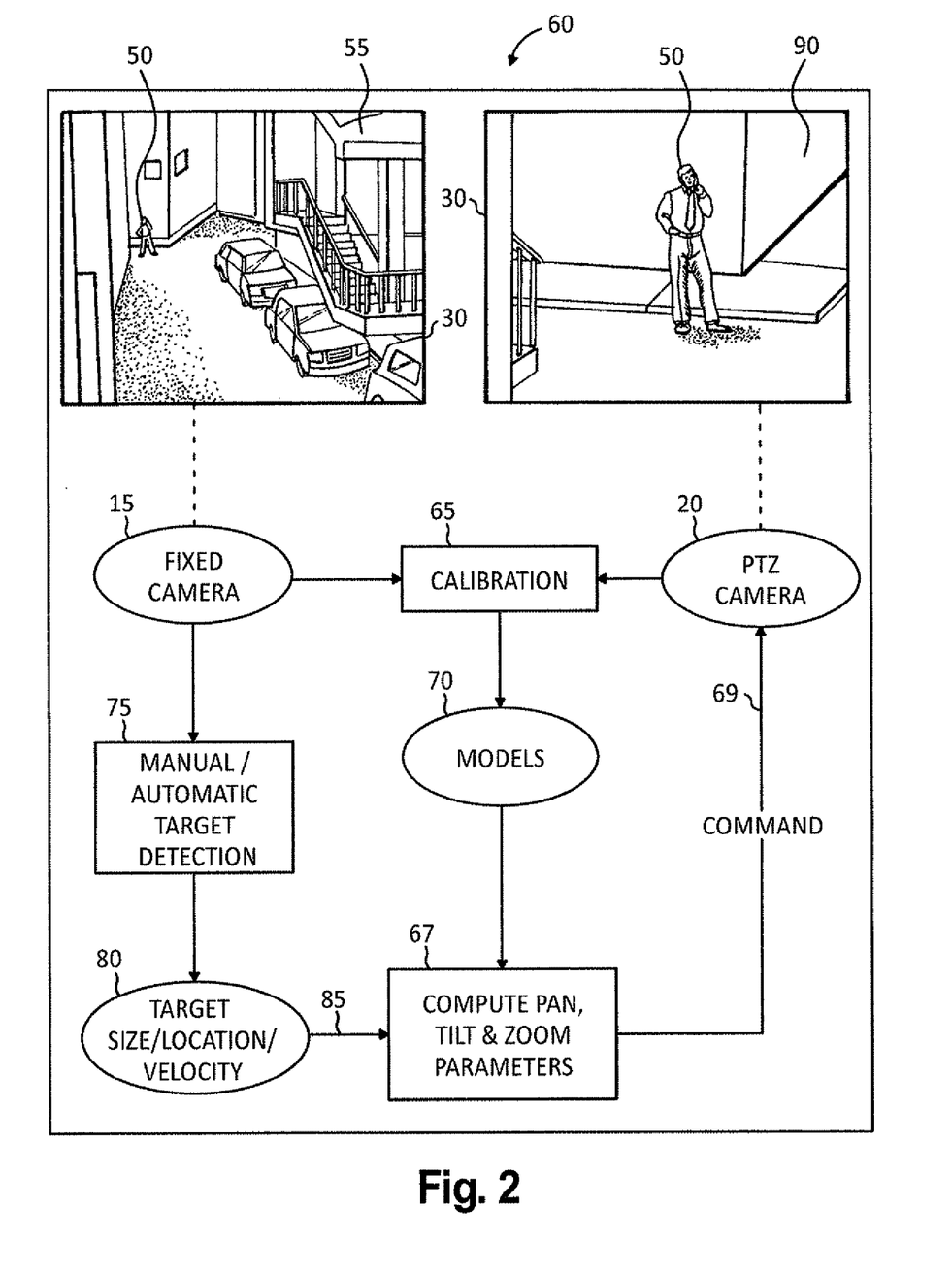
FIG. 2 shows a high-level block diagram of the surveillance system to indicate the models to calibrate and control the second camera in master-slave control relationship.

Turning to FIG. 2, there is shown a high-level block diagram of a system 60. The system 60 has a first and second camera in a master/slave control relationship. The system 60 includes a fixed first camera 15 and a PTZ camera 20. Each camera 15, 20 is calibrated with one another at block 65 to provide at least one model 70. The fixed first camera 15 can receive video images along a wide field of view 55 as represented by a screen showing the field of view 55. A target 50 may enter the first wide field of view 55. The target 50 is manually or automatically detected at block 75 and the target size, location and velocity is identified at block 80. In the exemplary embodiment, the target size, location and velocity are communicated along line 85 to block 67.

Using the model 70, the system 60 computes the appropriate pan, tilt and zoom parameters shown as block 67. The parameters 67 for pan, tilt and zoom will then be communicated in a control signal along line 69 to the PTZ camera 20. The PTZ camera 20 will use the pan, tilt and zoom parameters 67 to focus in on the target 50 in the PTZ field of view 55 and obtain an enhanced image as shown in reference number 90 of the target 50. It should be appreciated that the enhanced image 90 provides additional magnification and detail to the image captured by the first camera 15 and this additional detail can be communicated and displayed to the end user using a video display 30.

In the exemplary embodiment, the PTZ camera 20 receives control commands over a serial communication port (not shown) from processor 25 through the central bus 40 of FIG. 1. The present system 60 does not need to read a current position of the PTZ camera 20 to control the pan, tilt or zoom functions of the PTZ camera 20 and this control can be accomplished by a master-slave control arrangement.

Figure 3:
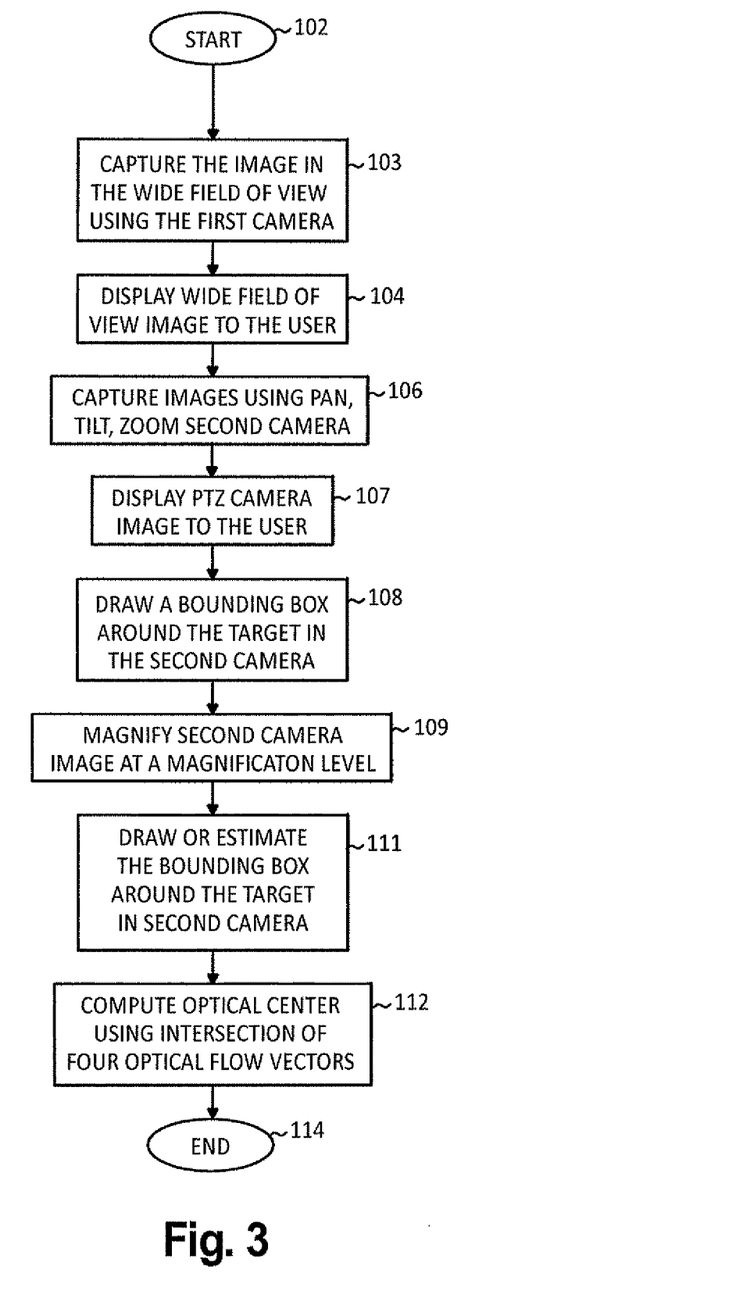
FIG. 3 shows a flow chart of a calibration method to determine an optical center of the PTZ camera image.

Turning now to FIG. 3, there is shown a method for computing an optical center of the second camera 20 shown in FIG. 1. The optical center of the second camera 20 coincides with the center of the target 50 image displayed in FIG. 2 of the first camera 15. For zooming in on a target 50, it is essential to position the target 50 at the optical center, and the present method computes the optical center using the intersection of optical flow vectors.

In the exemplary embodiment, the method commences at step 102. At step 103, the first camera 15 captures an image. At step 106, the pan, tilt, zoom second camera 20 captures an image of the target 50 in the field of view 55 area. Both images are displayed at steps 104 and 107. At step 108, the user is prompted from a message on the display 30 to provide an input signal. In the illustrated embodiment, the user is asked to draw a bounding box using a graphical interface tool 45 operable on a software product stored on memory 35 around any natural or human target standing perpendicular to ground at zero zoom. Thereafter, the image is magnified of the PTZ second camera 20 image to the maximum zoom at step 109. It should be appreciated that it may be advantageous in some embodiments to use a maximum zoom since this improves the accuracy of the optical center calculation, however this is not limiting and a less than maximum zoom can be used, such as a predetermined percentage of the maximum zoom or a predetermined value less than the maximum zoom. It should be appreciated that any zoom value can be used that provides accuracy.

At step 111, the user is again prompted from a message on the display 30 to draw a bounding box using a graphical interface tool operable on a software product stored on memory 35 around the magnified target 50 (natural or human target standing perpendicular to ground at increased zoom). The first and second bounding boxes form four optical flow vectors and the optical center is computed using the intersection of the four optical flow vectors for the PTZ camera 20 image. This optical center is estimated in a least square manner. The optical center for the PTZ camera 20 is stored in memory 35 for later access. Thereafter, the method ends at step 114.

Figure 4:
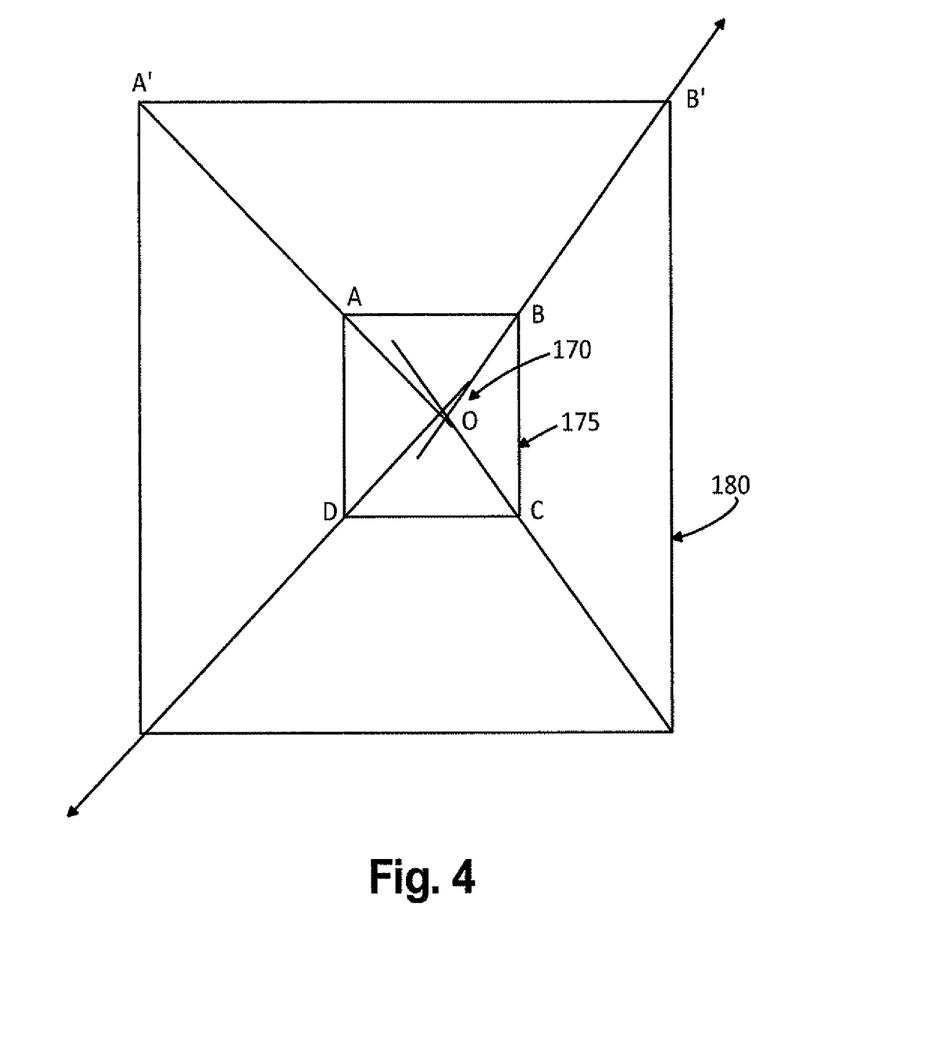
FIG. 4 shows a first bounding box drawn around a target at a first magnification level and a second bounding box drawn around the target at a second magnification level to determine the optical center of the image by the resulting optical vectors from the two boxes in a graphical user interface.

Turning now to FIG. 4, there is shown the method for determining the optical center 170. In the exemplary embodiment, the optical center 170 is computed using a first bounding box 175 as defined by points A, B, C, and D at a zero magnification while the second bound box 180 is defined by points A', B', C', and D' at a relatively higher magnification. The optical flow vector defined by AA', BB', CC', and DD' all converge to the optical center 170. Therefore, the formula for the computation of the optical center 170 can be found as follows.

If a set of points in image coordinates at a lower zoom level is given by $(x^i_0, y^i_0 / i=1, 2, 3, 4)$ and the corresponding points at a higher zoom level is given by $(x^i_1, y^i_1 / i=1, 2, 3, 4)$, then the formula for the optical center $(x_c, y_c)$ is given by:

$$\begin{bmatrix} -(y^0_1 - y^0_0) & (x^0_1 - x^0_0) \\ -(y^1_1 - y^1_0) & (x^1_1 - x^1_0) \\ -(y^2_1 - y^2_0) & (x^2_1 - x^2_0) \\ -(y^3_1 - y^3_0) & (x^3_1 - x^3_0) \end{bmatrix} \times \begin{bmatrix} x_c \\ y_c \end{bmatrix} = \begin{bmatrix} y^0_1(x^0_1 - x^0_0) - x^0_1(y^0_1 - y^0_0) \\ y^1_1(x^1_1 - x^1_0) - x^1_1(y^1_1 - y^1_0) \\ y^2_1(x^2_1 - x^2_0) - x^2_1(y^2_1 - y^2_0) \\ y^3_1(x^3_1 - x^3_0) - x^3_1(y^3_1 - y^3_0) \end{bmatrix}$$

Figure 5A:
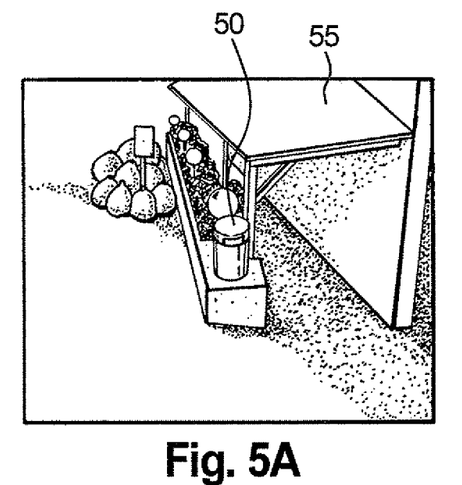
FIGS. 5A-5D show an image with an optical center and the resulting magnification from the optical center as compared with magnification of an image using an image center.
Figure 5B:
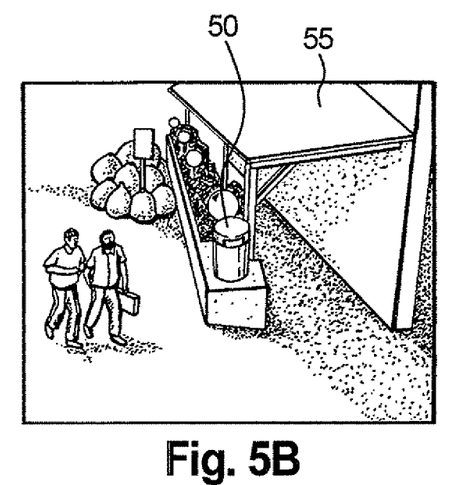
Figure 5C:
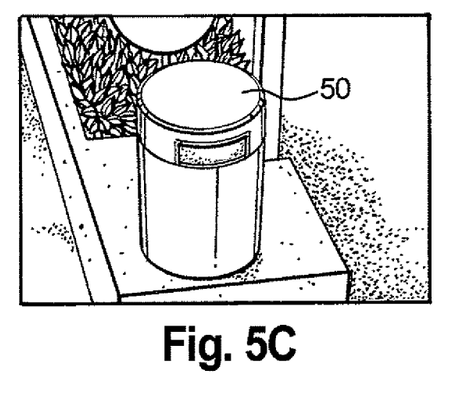
Figure 5D:
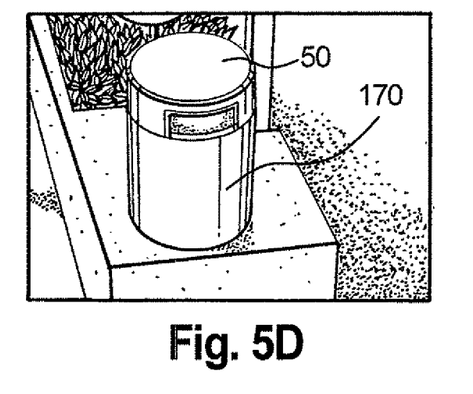

It should be appreciated that it is also possible to use more than two bounding boxes being drawn or generated at a number of zoom levels as this will result in an improved accuracy in the optical center estimation. For an ideal camera, the optical center should coincide with the image center. However, in practice the optical center can deviate considerably from the image center due to a misalignment between the charge coupled device (CCD)) array and the camera lens. Turning now to FIG. 5A-5D, there is shown four views showing the distinction of using an optical center 170 versus and image center and the effects when magnifying the images. FIG. 5A shows the target 50 being placed at the image center, and FIG. 5C shows the target 50 magnified. As can be seen, the target 50 has migrated slightly away from the image center, which is not favored. Turning now to FIG. 5B, there is shown the target being placed at the optical center 170. As shown in the magnified image in FIG. 5D, the target is placed at the optical center 170 and no migration has occurred, which is advantageous.

Figure 6:
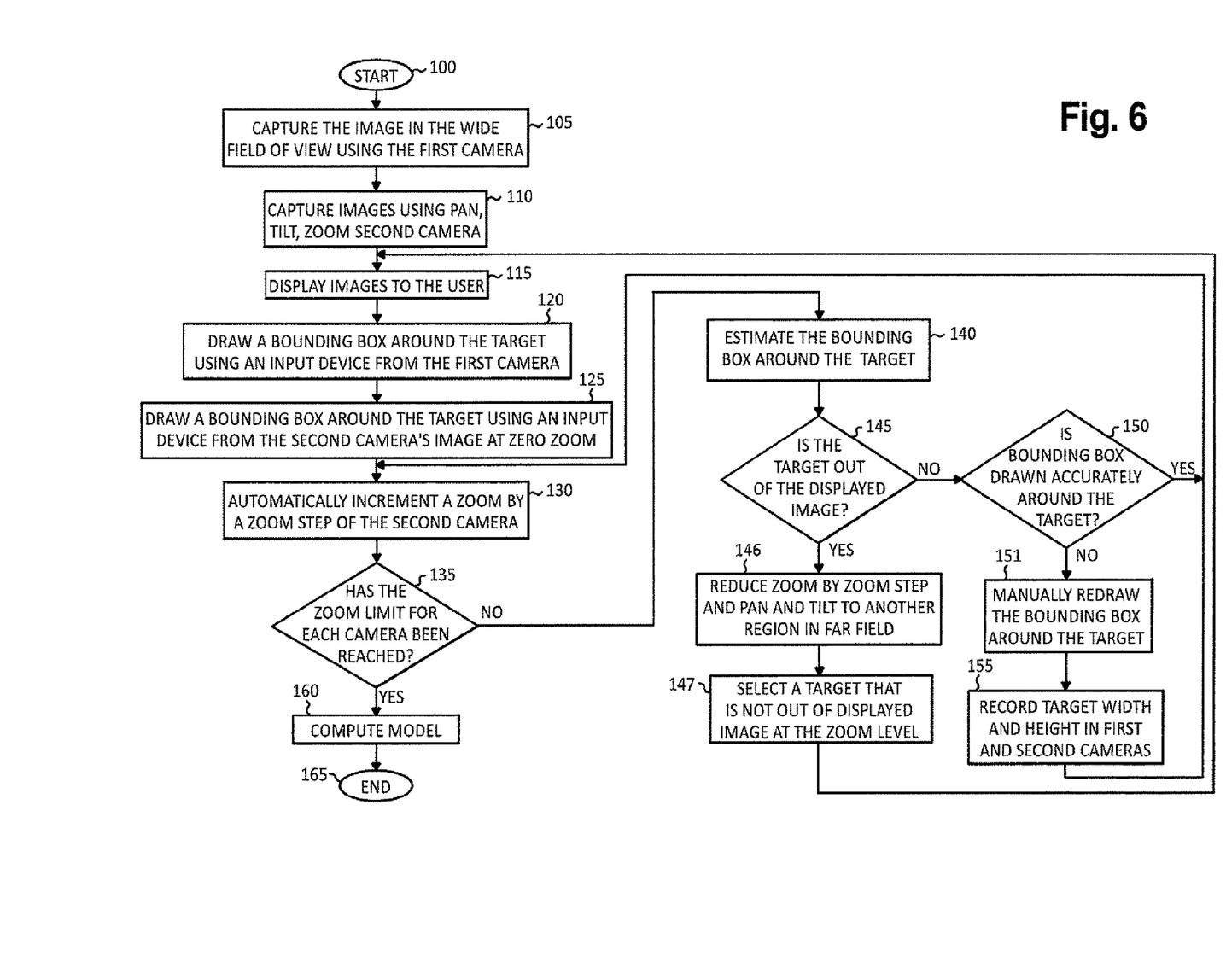
FIG. 6 shows a flow chart of a calibration method to determine a zoom ratio between the first camera and the second camera.
Figure 7A:
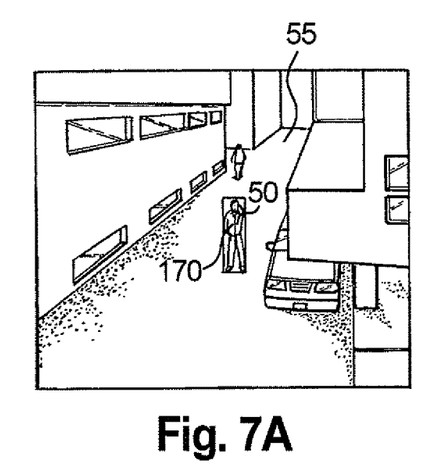
FIGS. 7A-7D show an image with an optical center with the user drawing a bounding box around a target for a number of magnification steps to determine the magnification ratio of the image relative to the image in the first camera.
Figure 7B:
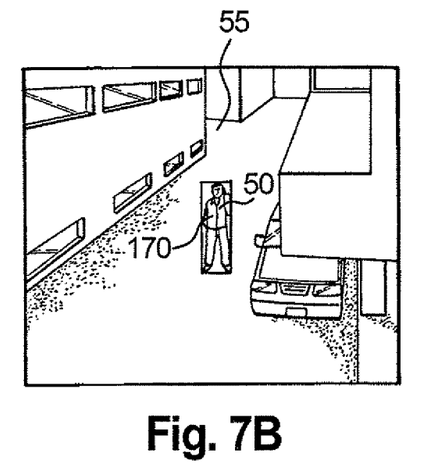
Figure 7C:
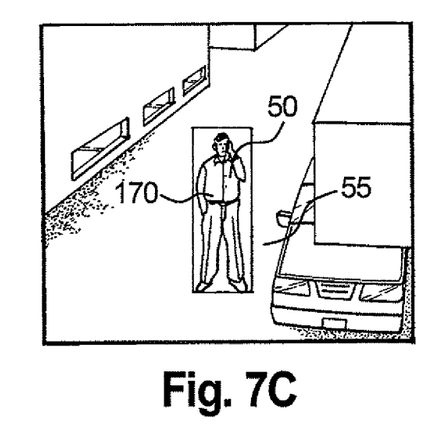
Figure 7D:
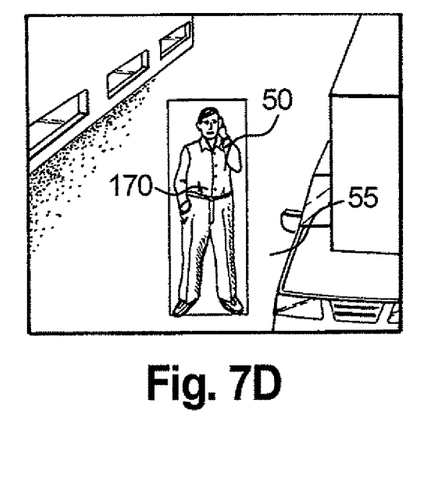

Turning now to FIG. 6, there is shown a process for calibrating the PTZ camera 20 operation with the operation of the first wide field of view camera 15 so the two cameras 15, 20 can operate to obtain enhanced magnified images from a target 50 as previously described. In the embodiment of FIG. 6, a zoom calibration method is shown for establishing a relative size ratio of targets 50 in the PTZ camera 20 image relative to the image of the target 50 in the first camera 15 image. The method 100 is shown as a semiautomatic method that can be used quickly and easily using a graphical interface 45. In the exemplary embodiment, a PTZ camera optical center 170 is computed according to the method of FIG. 3.

To zoom in on a target 50 discovered in the wide field of view camera 55 of FIG. 1, it is essential to position the target 50 in the optical center 170 of the captured image before conducting an enhanced magnified zoom step. If the target 50 is not positioned at the optical center 170, then the image will not be held in the center of the image, and may be outside of the field of view of the PTZ camera 20, after it has zoomed in. This is referred to as asymmetrical zoom or a migration of the view of the image and is disfavored.

The method starts at step 100 whereby the user is prompted on a display 30 to calibrate the two cameras 15, 20 (FIG. 1) for a master-slave control relationship. This can be done manually or at the time of manufacture. In the exemplary embodiment, the method continues to step 105 where the wide field of view of the first master camera 15 is received at step 105 and displayed at step 115. Thereafter, an image is received and captured by the PTZ camera 20 at step 110, and the PTZ camera image is displayed at step 115.

At step 120, the user identifies the first camera's image of a target 50 by an input command. In the exemplary embodiment, the first image from the first camera 15 is displayed. Using a graphical input device, the user draws a bounding box 175 around the target 55 at step 120. At step 125, the user estimates the second camera's target 50 by an input command. In the exemplary embodiment, the slave's target image is estimated by drawing a bounding box 175 around the target 55. Other input commands are envisioned and within the scope of the present disclosure, and this is only illustrative of one non-limiting embodiment.

Thereafter, the image is magnified by a zoom function of the PTZ camera 20. The controller 25 controls a lens of the PTZ camera 20 and magnifies the image to the maximum possible size while preventing the asymmetric zoom and preventing the image from migrating off of the display at step 130.

The magnified image is then displayed at step 140 to the user and the controller 25 then estimates a bounding box 180 at the higher magnification step. During each magnification step, the corner like features are located automatically using a computing method such as the Harris corner detector within each of the two bounding boxes 175, 180. The strongest match between the corner features is determined using a normalized cross correlation of the images. An affine transformation model for the target 50 is computed for each magnification change. A new bounding box is computed based on this affine transformation model. The bounding box at the higher magnification is then divided into at least four blocks and the strongest corner feature for each of the blocks is computed and then compared. Once the zoom level is increased again, the bounding box can be estimated again for the new magnification level as discussed above.

At step 150, the controller 25 outputs a signal to the display 30 to prompt the user to confirm that the bounding box estimation is accurate at step 150. If not accurate then, then step 151 is used to manually draw the bounding box using an input device. Steps 130-155 can be repeated for a number of times with even a higher magnification until a zoom limit is reached at step 135. If the image migrates off of the display 30 at step 145, then the magnification is reduced at step 146. Thereafter, a selection of a new target at step 147 is performed, and then the method can continue at step 120.

The target size (width and height) is recorded at step 155. At step 155, the relative size of the fixed camera image 15 and the PTZ camera image 20 for various zoom values within the maximum and minimum zoom values supported for the PTZ camera 20 are generated. One preferred way to represent this relative size is to use a log of a ratio of fixed image size and PTZ image size. The relative size may also be represented by other methods.

In the illustrated embodiment, a height and width of a target 50 in the first camera 15 image can be converted to the height and width of the same target 50 using the second PTZ camera 20 for each and every magnification step. These height and width values at various magnification levels are used to compute a model at step 160. This model 160 can be expressed in a second-degree polynomial or a functional relationship between the log ratio of the width and height of the target image and the magnification value. As can be seen in FIGS. 7A-7D, a bounding box is drawn over the target 50 in the field of view 55 for each magnification step as discussed in steps 125 through 150 of FIG. 6.

Figure 8:
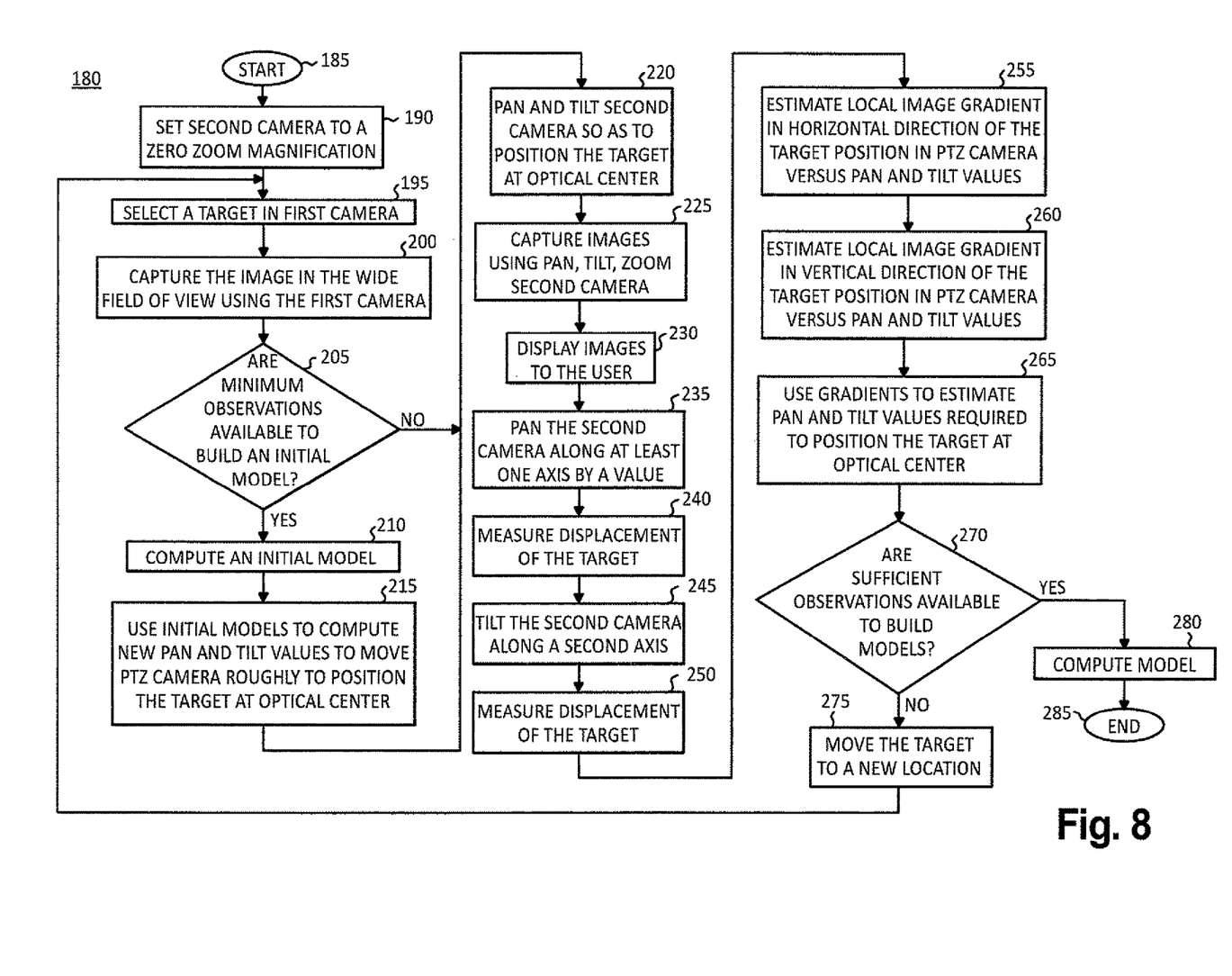
FIG. 8 shows a flow chart of a calibration method to determine a model of pan and tilt values between movement of coordinates of the first camera and the second camera.

Turning now to FIG. 8, there is shown a method of calibrating the wide field of view camera 15 with the PTZ camera 20 with the pan tilt model to establish a relationship between the fixed wide field of view camera 15 and the PTZ camera 20 and to compute the pan and tilt values that are required to position the target 50 at the PTZ camera's optical center 170. The calibration results in two polynomial expressions used to control the PTZ camera's 20 pan and tilt functions by the first camera 15 in a master-slave relationship. Turning again now to FIG. 2, once calibrated at box 65, the models 70 are established and the fixed camera 15 can compute the pan, tilt and zoom parameters at box 67 to provide the control commands to the PTZ camera 20 along line 69 for a master-slave operation.

Turning back to FIG. 8, in the exemplary embodiment, the method 180 commences at step 185. Thereafter, the method 180 receives a master image from the fixed wide field of view camera 15 and an image from the PTZ camera 20 (steps 200, 225) and both images are displayed to the user at step 230. In the exemplary embodiment, the PTZ camera 20 is set to a zero magnification level at step 190 and a target 50 is identified at step 195. Again, target 50 can be identified by drawing a bound box around the target 50 or by providing some type of input signal from an input device 45 using a graphical user interface or the like.

The target is first identified in the first camera using a display device in step 220. The second camera needs to be moved so the target is viewed close to the optical center of the second camera. This is performed using a pan and tilt model to compute the desired pan and tilt values and automatically applying these values to a second camera 20 using a controller 25 (FIG. 1) or manual maneuvering of the second camera 20 or a combination thereof. In the case a minimum number of observations to compute a pan and tilt model is available (step 205), an intermediate model is computed at step 210, and which is used to automatically position the second camera 20 optical center close to the target. A manual alignment of the PTZ camera 20 is supported in step 220. Manual alignment of the PTZ camera 20 can be carried out even after automatic model based alignment of the PTZ camera 20 for finer control. This alignment need not be precise as the precise estimation of pan and tilt values to position the second camera 20 are estimated based on the local gradient measures in step 265.

Thereafter, the method 180 continues to step 235. At step 235, the PTZ camera 20 is provided with a pan action signal to a pan motor (not shown) associated with the PTZ camera 20 from the controller 25 to pan the image along at least one axis by a predetermined pan amount, such as, for example, about one degree or more. At step 240, the displacement of the target 50 is measured and a signal is communicated to the controller 25, which is stored in memory 35 (FIG. 1).

Thereafter, the method 180 continues to step 245. At step 245, the PTZ camera 20 is provided a tilt action signal to a tilt adjusting motor (not shown) associated with the PTZ camera 20 from the controller 25. Controller 25 tilts the PTZ camera 20 and the image along at least one axis by a predetermined tilt amount, such as, for example, about one degree or more. At step 250, the displacement of the target 50 is again measured and a value is written to a memory 35 of FIG. 1. At step 255, a local image gradient in a horizontal direction of the PTZ image is measured versus pan and tilt angles applied to PTZ camera 20 in steps 235 and 245 to estimate the horizontal gradient as a function of pan and tilt. At step 260, a local image gradient in a vertical direction of the PTZ image is measured versus the pan and tilt angles applied to the PTZ camera 20 in steps 235, 245 to estimate the vertical gradient as a function of pan and tilt.

During manual or automatic model based alignment of the PTZ camera 20 in step 220, the target 50 is not perfectly positioned at the optical center of the PTZ camera, and there is a residual error. In step 265, the horizontal and vertical gradient values are used to apply a correction to pan and tilt angles of the PTZ camera 20 so as to precisely align the PTZ camera optical center on a center of the target's bounding box. In step 275, the target 50 is moved to a new location and steps 195 and 270 are repeated to acquire new observations. The process can be repeated until a sufficient number of observations are available to build models in a least square sense. The models are computed at step 280. In the illustrated embodiment, the pan or tilt model is expressed in terms of a second order polynomial function of the fixed image's coordinates.

It should be appreciated that the PTZ camera 20 receives pan, tilt and zoom values from the controller 25 to control operation. The controller 25 in the first field of view camera 15 records the target's 50 position parameter and size parameter. Then, the controller 25 records the position and size information. Controller 25 receives the target 50 position and size and uses that data to compute the pan and tilt values for the second camera 20. The zoom value is computed based on the ratio of the target 50 size from the first camera 15 image to a magnified size in the PTZ camera 20 image. The desired magnified image size for the PTZ camera 20 image can be set, however, this magnification is limited to a maximum size possible depending on the PTZ camera 20.

In yet another embodiment, instead of having a first camera and a second camera 15, 20 the present system 10 may include only a single PTZ camera 20 that accomplishes both functions as previously described. In the illustrated embodiment, the PTZ camera 20 can operate between a wide field of view mode and a second PTZ mode. In yet another embodiment, the present system 10 can be used with other analytics to avoid jitter, so the object appears in the middle of the view, or so the second camera 20 can follow a predetermined tracking path. System 10 may be used with various face detection, people detection video analytical software products or devices. Various configurations are possible and within the scope of the present disclosure. The present disclosure may also support, instead of magnifying an image or providing an enhanced view of a target 50, providing a mask around the target to obscure the target for a more precise privacy zone mask in a developed and calibrated environment. The privacy zone masking is used in conjunction with a single PTZ camera 20. The user may draw a virtual zone in a wide field of view (zero zoom or a master view) of the PTZ camera 20 and the real time image can be masked in a camera view under all pan, tilt, and zoom positions of the PTZ camera 20. In such applications, controller 25 reads the pan, tilt and zoom values of the PTZ camera 20 and uses these pan, tilt, zoom calibration models to relate the coordinates of virtual mask zone in master view with the second PTZ mode image coordinates. On the contrary, a master-slave control relationship application can use the target coordinates in a master view to compute the desired pan, tilt, and zoom values to obtain a magnified view of the target 50 in the second PTZ mode.

The embodiments described above are illustrative examples and it should not be construed that the present invention is limited to these particular embodiments. Thus, one skilled in the art may change and modify features without departing from the spirit or scope of the invention as defined in the appended claims.

What is claimed is:

1. A method comprising:
providing a first camera with a first field of view;
providing a second camera with a second field of view, wherein the second camera is a pan, tilt, zoom camera;
receiving a bounding box drawn around a target in the first field of view, the bounding box identifies the target within the first field of view;
determining an optical center of the target for use in the second field of view from a set of corner features of the bounding box;
determining a magnification ratio between the target located in the first field of view relative to the second field of view that prevents the bounding box from migrating off of the second field of view;
determining a pan and tilt model that provides a predetermined relationship between first camera coordinates of the bounding box and pan and tilt values to position the second camera with a center of the second field of view coincident with the optical center;
capturing the target in the first field of view; and
controlling the second camera to record the target in the second field of view with the second field of view being an enhanced view relative to the first field of view, wherein the first camera and the second camera operate in a master-slave arrangement such that the first camera controls at least one of pan, tilt, or zoom of the second camera.

2. The method of claim 1, wherein the enhanced view is a magnified view of the target.

3. The method of claim 1, wherein the first field of view is a wider field of view relative to the second field of view.

4. The method of claim 1, further comprising controlling the second camera to record the target by receiving a magnified value, a pan adjustment value and a tilt adjustment value from the first camera.

5. The method of claim 1, further comprising determining the optical center by an intersection of optical vectors formed by a first bounding box drawn over the target at a first magnification and by a second bounding box drawn over the target at a second magnification level.

6. The method of claim 1, further comprising providing a single PTZ camera to perform functions for both the first and the second cameras.

7. The method of claim 1, further comprising determining the magnification ratio between the target located in the first field of view relative to, the second field of view by:
capturing an image with the first camera in the first field of view;
capturing the image with the second camera in the second field of view;
providing a first input associated with the image in the first field of view; and
providing a second input with the image in the second field of view;
magnifying the image in the second field of view; and
correlating the first and the second inputs to form the magnification ratio.

8. The method of claim 7, wherein the first input comprises drawing a first bounding box around the target in the first field of view using a graphical interface.

9. The method of claim 8, wherein the second input comprises drawing a second bounding box around the target in the second field of view using the graphical interface.

10. The method of claim 7, wherein the magnification ratio provides at least a height and a width of the image for a plurality of magnification steps.

11. The method of claim 1, further comprising determining the pan and tilt model that provides the relationship between the first camera coordinates and the pan and tilt values to position the second camera at the optical center by:
panning and tilting the second camera to position the target at a second optical center; and
incrementally panning the second camera by a predetermined amount between at least two directions and measuring a displacement of the target in the second field of view.

12. The method of claim 11, further comprising determining the pan and tilt model by:
incrementally tilting the second camera by a predetermined amount between at least two directions and measuring a displacement of the target in the second field of view.

13. The method of claim 12, further comprising determining the pan and tilt model by:
determining a horizontal and a vertical gradient as a function of pan and tilt.

14. The method of claim 13, further comprising converting the target coordinates received by the first camera using the pan and tilt model to a second format for the second camera having the second field of view; the second format including pan, tilt, and zoom parameters for the target image to provide the enhanced image.

15. The method of claim 11, further comprising incrementally panning the second camera by at least one degree between at least two directions and measuring the displacement of the target in the second field of view.

16. The method of claim 12, further comprising incrementally tilting the second camera by at least one degree between at least two directions and measuring the displacement of the target in the second field of view.

17. A security system comprising:
a first camera recording a first field of view;
a second camera in a master-slave arrangement with the first camera, the second camera including a panning function, a tilting function, and a magnification function recording a second field of view, the second camera being a pan, tilt, zoom camera;
the first camera recording a target in the first field of view, and outputting a control signal to a computing device indicative of a location parameter including at least a set of coordinates of the target in the fixed field of view;
the computing device receiving the control signal and converting the control signal to a second signal, the second signal identifying an optical center of the target determined from the location parameter;

the second camera receiving the second signal and adjusting engaging in at least one function including the panning function, the tilting function, and the zooming function to record the target in the second field of view in response to the second signal;

a user interface that asks a user for and receives a plurality of respective bounding boxes drawn by the user around the target on an image of the target;

the second camera being calibrated to the first camera by a model wherein the computing device uses the model to center the identified optical center within the second field view and prevent the target from migrating off the second field of view and wherein the model includes at least one of (a) an optical center of the target for the second field of view determined from the plurality of bounding boxes generated around the target and a set of corner features of those boxes, (b) a magnification ratio between the target located in the first field of view relative to the second field of view and (c) a pan and tilt model that provides a relationship between a first camera coordinates and pan and tilt values to position the second camera at the optical center.

* * * * *